(12) United States Patent
Perrin et al.

(10) Patent No.: US 8,010,597 B2
(45) Date of Patent: Aug. 30, 2011

(54) COMPONENTIZED SITE ENGINE SERVICES

(75) Inventors: Brian M. Perrin, Redmond, WA (US); Jeffrey E. Steinbok, Redmond, WA (US); Karen G. Luk, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 11/857,904

(22) Filed: Sep. 19, 2007

(65) Prior Publication Data

US 2009/0077177 A1 Mar. 19, 2009

(51) Int. Cl.
*G06F 15/16* (2006.01)
(52) U.S. Cl. ......... 709/203; 709/217; 709/220; 717/163
(58) Field of Classification Search .................. 709/204, 709/217, 218, 219, 203, 220; 717/107, 163, 717/164, 166
See application file for complete search history.

(56) References Cited

U.S. PATENT DOCUMENTS

| | | | |
|---|---|---|---|
| 6,405,224 | B1 | 6/2002 | Van Der Meer |
| 7,069,308 | B2 * | 6/2006 | Abrams ........................ 709/218 |
| 7,117,254 | B2 * | 10/2006 | Lunt et al. ..................... 709/218 |
| 2001/0016880 | A1 | 8/2001 | Cai et al. |
| 2002/0152402 | A1 | 10/2002 | Tov et al. |
| 2003/0033296 | A1 * | 2/2003 | Rothmuller et al. ............. 707/3 |
| 2003/0040970 | A1 | 2/2003 | Miller |
| 2004/0034646 | A1 | 2/2004 | Kimball et al. |
| 2004/0049534 | A1 | 3/2004 | Nickerson et al. |

(Continued)

FOREIGN PATENT DOCUMENTS

WO 02069541 A2 9/2002

(Continued)

OTHER PUBLICATIONS

Geng et al., "Scaling Web Services with Capacity Provision Networks," IEEE Computer Society, Nov. 2003, pp. 64-72, IEEE, USA.

(Continued)

*Primary Examiner* — Abdullahi Salad
*Assistant Examiner* — Jimmy H Tran
(74) *Attorney, Agent, or Firm* — Senniger Powers LLP

(57) ABSTRACT

A plurality of modules which provide a user with tools for engaging in social networking are created. The plurality of modules are associated with a service. A server hosting the web space receives a selection from the user corresponding to a first module. In response to the selection, the server associates the service with the web space. The first module renders the web space on a client accessing the web space. The server enables a visitor to the web space to access a second module form the plurality of modules associated with the service. The accessed second module will display the web space in a second format on the client of the visitor.

16 Claims, 3 Drawing Sheets

U.S. PATENT DOCUMENTS

| | | | |
|---|---|---|---|
| 2005/0015491 A1 | 1/2005 | Koeppel | |
| 2005/0021750 A1* | 1/2005 | Abrams | 709/225 |
| 2005/0080804 A1 | 4/2005 | Bradshaw, Jr. et al. | |
| 2005/0235062 A1* | 10/2005 | Lunt et al. | 709/225 |
| 2005/0278748 A1 | 12/2005 | Koh et al. | |
| 2006/0156330 A1 | 7/2006 | Chiu | |
| 2006/0190281 A1* | 8/2006 | Kott et al. | 705/1 |
| 2007/0005750 A1* | 1/2007 | Lunt et al. | 709/223 |
| 2007/0192299 A1* | 8/2007 | Zuckerberg et al. | 707/3 |
| 2008/0040673 A1* | 2/2008 | Zuckerberg et al. | 715/745 |
| 2008/0071883 A1* | 3/2008 | Alterman | 709/217 |
| 2008/0222199 A1* | 9/2008 | Tiu et al. | 707/104.1 |
| 2008/0288499 A1* | 11/2008 | Choi etal. | 707/9 |
| 2009/0049525 A1* | 2/2009 | D'Angelo et al. | 726/4 |

FOREIGN PATENT DOCUMENTS

| | | |
|---|---|---|
| WO | 2005081672 A2 | 9/2005 |

OTHER PUBLICATIONS

Fu et al., "Modeling, Validating, and Automating Composition of Web Services," ICWE, 2006, pp. 217-224, ACM, USA.

Chamberland, "Componentization of HTML-Based Online Help," pp. 165-168, 1999, ACM, USA.

Lindquist et al., "Component Framework for Web-Based Learning Environments," Arizona State University, 6 pages, USA.

* cited by examiner

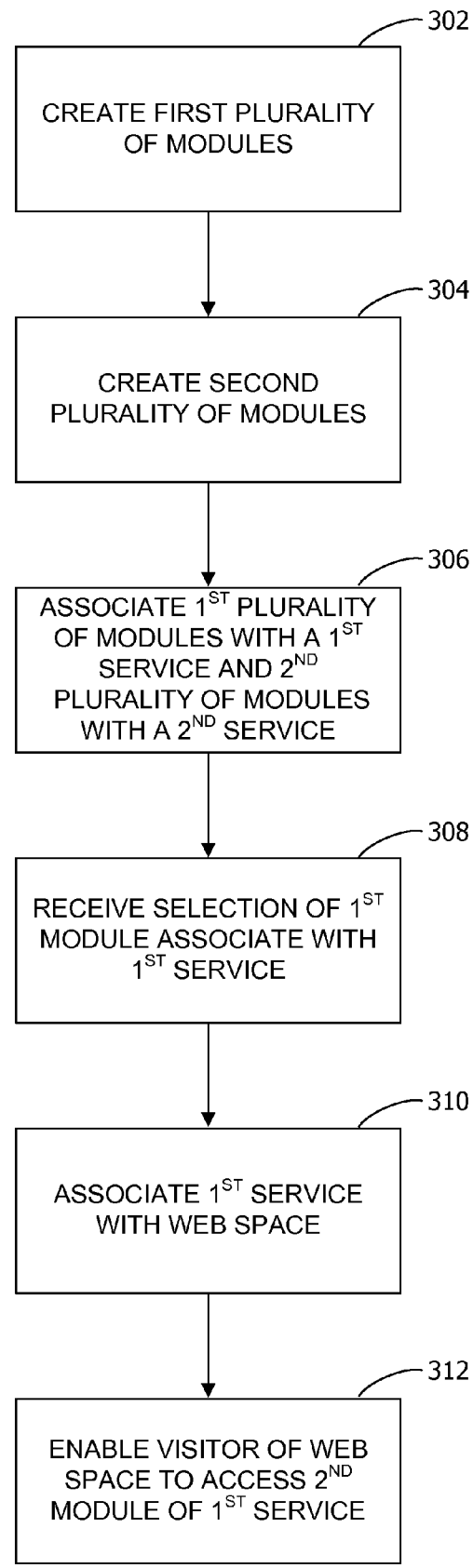

COMPONENTIZED SITE ENGINE SERVICES

BACKGROUND

Many computer users enjoy using the Internet as a platform for social networking A set of personal Internet services and software allow users to access relationships, information and interests through a web space. In general, a user creates and customizes a web space with content personal to the user. For example, a user may create a blog (a series of entries written in chronological order and displayed in reverse chronological order) to express their thoughts or ideas, create lists of favorite songs, books, web spaces or movies, keep up with friends and family, meet new people, and publish photos online through the web space. Additionally, some web spaces interface with instant messaging utilities (a form of real-time communication between two or more people based on typed text) and other utilities that allow a visitor to the web space to interact with the web space (i.e., sign a guest book or leave comments). Typically, the web space also provides a way for the owner of a space to control privacy settings of the space to determine who can access the web space or who may interact with the web space. In general, the user determines the format and layout of the web space for a visitor to the web space. However, the visitor may prefer to view the web space in another format.

SUMMARY

Embodiments of the invention include systems and methods for associating a service with a web space. In an embodiment, the invention includes a method for associating a service to a web space. A plurality of modules which provide a user with tools for engaging in social networking are created. The plurality of modules are associated with a service. A server hosting the web space receives a selection from the user corresponding to a first module. In response to the selection, the server associates the service with the web space. The first module renders the web space on a client accessing the web space. The server enables a visitor to the web space to access a second module from the plurality of modules associated with the service. The accessed second module will display the web space in a second format on the client of the visitor.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 3 is an exemplary flow diagram illustrating a method for associating a plurality of services to a web space for a user.

Corresponding reference characters indicate corresponding parts throughout the drawings.

DETAILED DESCRIPTION

Figure 1:
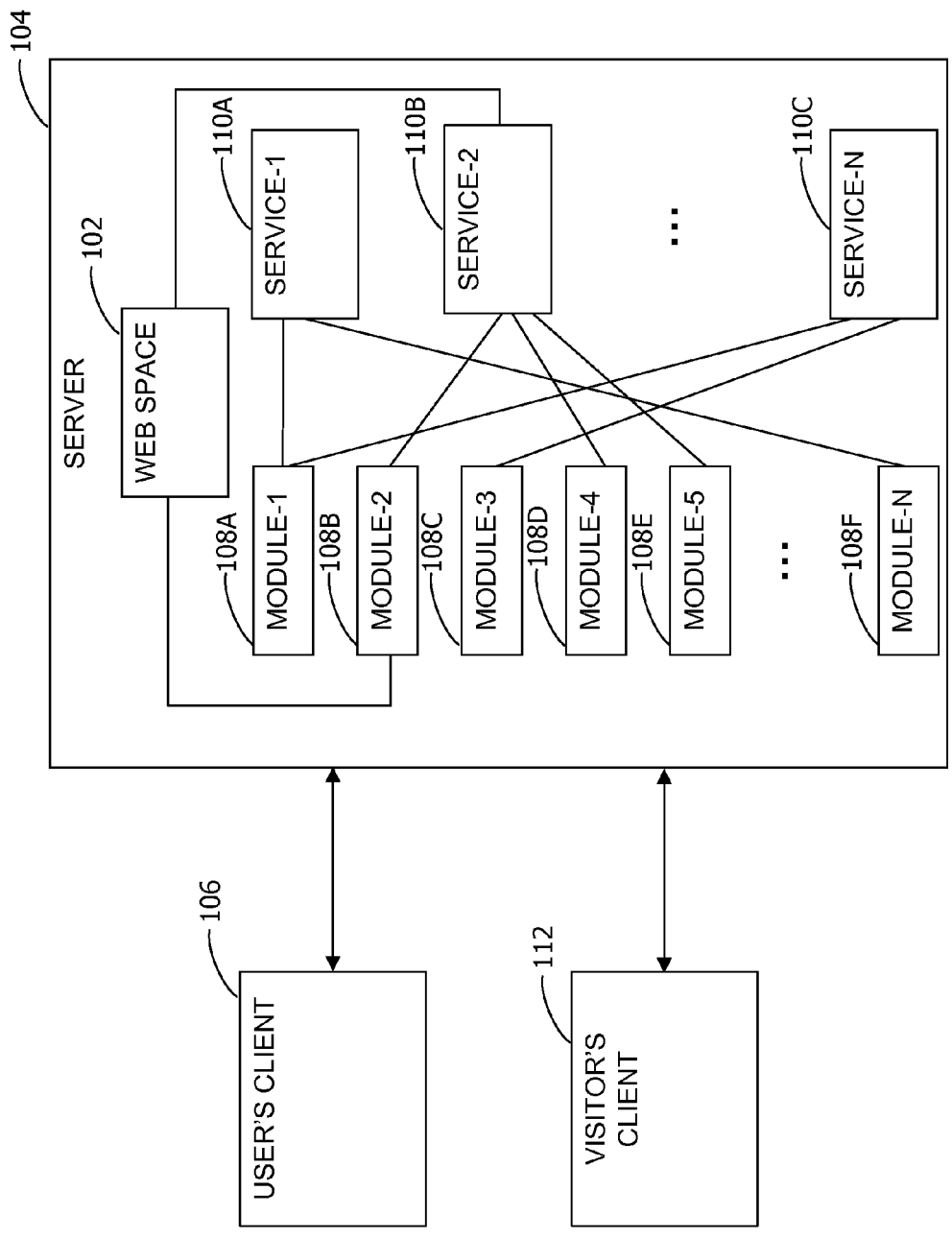
FIG. 1 is a block diagram illustrating one example of a suitable computing system environment in which the invention may be implemented.

FIG. 1 illustrates a system for rendering a user's web space 102 to a visitor including a server 104 for hosting the user's web space 102. In an embodiment, the user accesses the web space 102 via a client 106. The server 104 is configured for executing instructions for creating a plurality of modules 108A, 108B, 108C, 108D, 108E, 108F; associating the plurality of modules (e.g., module-1 108A, module-2 108B, module-3 108C, module-4 108D, module-5 108E and module-N 108F) with a service (e.g., service-1 108A, service-2 108B, service-N 108C); and, identifying a first module selected by the user. A logical grouping of modules is created by associating a module with the service. For example, FIG. 1 illustrates an embodiment with three services where module-1 108A and module-N 108F are associated with service-1 110A; module-2 108B, module-4 108D and module-5 108E are associated with service-2 110B; and, module-1 108A and module-3 108C are associated with service-N 110C.

In an embodiment, the services include one or more of the following: photo sharing, blogging, people, advertising and lists. And, in another embodiment, the plurality of modules include one or more of the following: small photo viewer, large photo viewer, blog writer, blog categories, blog archives, radio, guestbook, friends, profile, music list, music list index, custom list, book list, blog list, movie list.

The plurality of modules (e.g., module-1 108A, module-2 108B, module-3 108C, module-4 108D, module-5 108E, module-N 108F) provide the user with one or more tools for engaging in social networking. For example, a service named photo sharing is associated with two modules, a small photo viewer and a large photo viewer. The small photo viewer renders thumbnail-sized photos in the web space 102 and the large photo viewer renders photos one at time in a large, slideshow-like format in the web space 102.

In response to the selection of a first module (e.g., module-1 108A, module-2 108B, module-3 108C, module-4 108D, module-5 108E and module-N 108F) by the user, the server identifies the first module selected by the user. Then, the server 104 associates the service with the selected first module with the web space 102. For example, as illustrated in FIG. 1, the user has selected module-2 108B and, in response, the server 104 has associated both module-2 108B and corresponding service-2 with the web space 102. Advantageously, by associating the service with a web space 102 performance of the server 104 is increased because the server 102 does not have to make repeated calls to storage of the server 104 to determine what modules may be applicable to the web space 102.

When a client 112 connects the visitor to the user's web space 102, the first module renders the web space 102 on the client 112. The visitor's client 112 includes instructions for accessing the web space 102 and identifying a second module (e.g., module-1 108A, module-2 108B, module-3 108C, module-4 108D, module-5 108E, module-N 108F).

First, when the visitor's client 112 accesses the web space 102 of the user, the first module renders the web space 102 in a first format on the client 112. Second, when the visitor's client 112 selects a second module with the service, the second module renders the user's web space on the client 112 of the visitor in a second format. For example, for a blog service, suppose the user selects a category view of the blog for the web space 102 such that blog entries are formatted into summary categories. Now, a visitor to the user's space may select to view the blog in another format, such as an archive view where all blog entries are formatted in a reverse chronological order.

Figure 2:
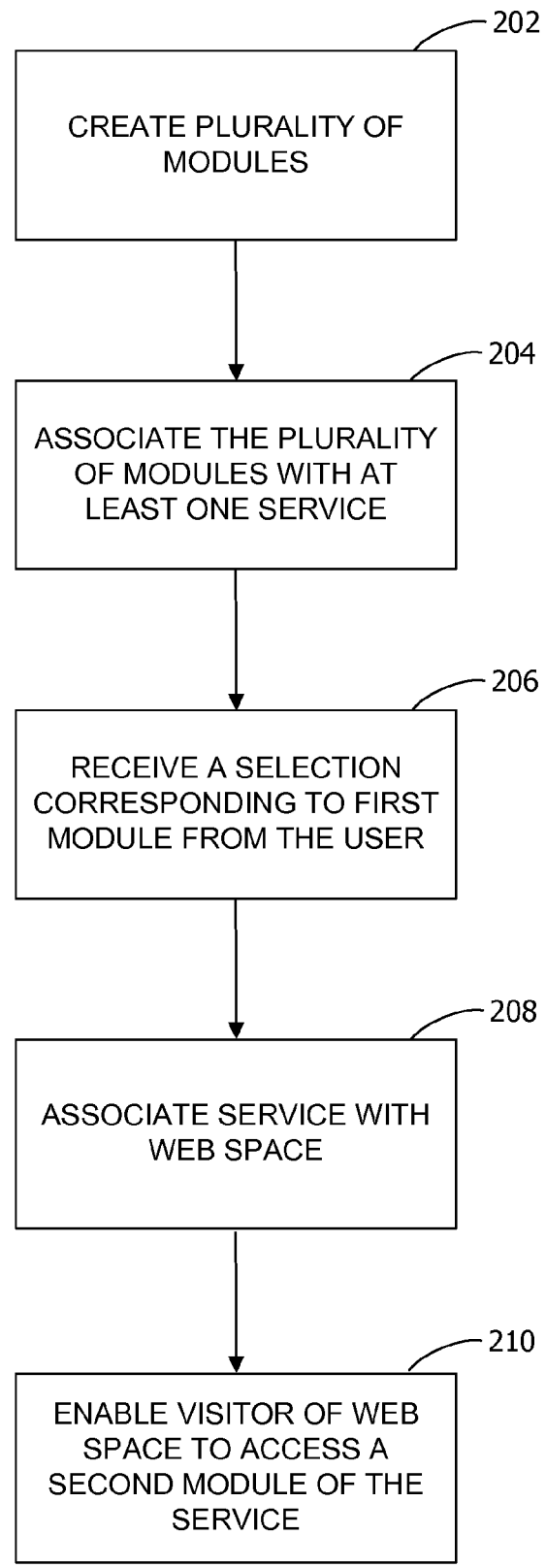
FIG. 2 is an exemplary flow diagram illustrating a method for associating a service to a web space.

FIG. 2 is a flow diagram of a method for associating a service (e.g., service-1 108A, service-2 108B, service-N 108C) to a web space 102. In an embodiment, one or more computer-readable storage media with instructions perform the method of claim 1.

At 202, a plurality of modules (e.g., module-1 108A, module-2 108B, module-3 108C, module-4 108D, module-5 108E, module-N 108F) is created. In an embodiment, each of the plurality of modules is defined as a serialized XML object stored in a database. Appendix A contains an exemplary XML definition for the service of the web space.

The plurality of modules provides a user with one or more tools for engaging in social networking via the web space 102. In an embodiment, the modules include one or more of the following: small photo viewer, large photo viewer, blog writer, blog categories, blog archives, radio, guestbook, friends, profile, music list, music list index, custom list, book list, blog list, movie list.

At 204 the server 102 associates the plurality of modules with at least one service. In an embodiment, the service includes one or more of the following: photo sharing, blogging, people, advertising and lists. And at 206, the server 102 receives a selection corresponding to a first module from the user. In an alternative embodiment, the user may customize the selected first module. For example, the user may select fonts, colors and layouts for the selected first module. The first selected module formats content for the user's web space 102 (e.g., blog, photos, lists). Alternatively, the first selected module may add advertising to the user's web space 102. In this alternative embodiment, the user may receive a fee for any product that a visitor to the web space 102 purchases via a link or ad included in the web space 102.

In response to the received selection, at 208, the server 102 associates the service with the web space 102. The first module renders the web space on a client 112 accessing the web space 102.

And, by associating the service with the web space, at 210 the server enables a visitor to the web space 102 via the client 112 to access a second module from the plurality of modules associated with the service. In an embodiment, the first module renders the web space 102 in a first format on the client 112 to the visitor. When the server receives a selection corresponding to a second module from the visitor via the client 112, the second module renders the user's web space 102 on the client 112 of the visitor in a second format. The second module and the first module are associated with the same service. Advantageously, by selecting the second module, the web space 102 (via the service) is formatted for the visitor without requiring the user to include the second module in the web space 102.

In an embodiment, the first module previously associated with the web space 102 at 208 is disassociated from the web space 102 by the user. The server 104 determines if no modules associated with the service are associated with the web space 102. If no modules associated with the service remain associated with the web space 102, the server 104 disassociates the service from the web space 102 and blocks the visitor to the web space 102 from selecting the second module. The second module and first module are associated with the disassociated service.

FIG. 3 is a flow diagram of a method for associating a plurality of services (e.g., service-1 108A, service-2 108B, service-N 108C) for a web space 102 for a user. The web space 102 is used by the user for rendering content to a visitor of said web space 102. In an embodiment the user accesses the web space 102 via a user's client 106 and the visitor accesses the web space 102 via visitor's client 112.

At 302, a first plurality of modules (e.g., module-1 108A, module-2 108B, module-3 108C, module-4 108D, module-5 108E, module-N 108F) are created. The first plurality of modules provides the user with one or more tools for rendering content in the web space 102. And, at 304, a second plurality of modules (e.g., module-1 108A, module-2 108B, module-3 108C, module-4 108D, module-5 108E, module-N 108F) is created. The second plurality of modules also providing the user with one or more tools for rendering content in the web space 102.

In an embodiment, the first and second plurality of modules providing the user with tools for engaging in social networking. For example, the first and second plurality of modules may include one or more of the following: small photo viewer, large photo viewer, blog writer, blog categories, blog archives, radio, guestbook, friends, profile, music list, music list index, custom list, book list, blog list, movie list.

At 306, the server 104 associates the first plurality of modules with a first service and the second plurality of modules with a second service. In an embodiment, the first and second service includes one or more of the following: photo sharing, blogging, people, advertising and lists. In an alternative embodiment, the server may associate the second service with the first service.

At 308, the server 104 receives a selection of a first module from the user. The first module is associated with the first service. In an embodiment, the user customizes the selected first module. In response to the selection at 308, at 310 the server 104 associates the first service the web space 102. The first module renders the web space 102 on a client 112 accessing the web space 102. And, at 312, the server 104 enables a visitor to the web space 102 to access a second module from the first plurality of modules associated with the first service.

In an embodiment, when the visitor accesses the web space via the visitor's client 112, the first module renders the web space 102 in a first format on the client 112 of the visitor. Then, when the server 104 receives a selection corresponding to a second module from the visitor via the client 112 accessing the web space 102, the second module renders the user's web space 102 on the client 112 of the visitor in a second format. The second module and the first module are associated with the first service, Referring again to FIG. 1, FIG. 1 shows one example of a general purpose computing device in the form of a computer (e.g., client 106, client 112, and server 104). The computer has one or more processors or processing units and a system memory. The computer typically has at least some form of computer readable media. Computer readable media, which include both volatile and nonvolatile media, removable and non-removable media, may be any available medium that may be accessed by computer. By way of example and not limitation, computer readable media comprise computer storage media and communication media.

Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer.

Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

A user may enter commands and information into computer through input devices or user interface selection devices such as a keyboard and a pointing device (e.g., a mouse, trackball, pen, or touch pad). Other input devices (not shown) may include a microphone, joystick, game pad, satellite dish, scanner, or the like. These and other input devices are connected to processing unit through a user input interface that is coupled to system bus, but may be connected by other interface and bus structures, such as a parallel port, game port, or a Universal Serial Bus (USB). A monitor or other type of display device is also connected to system bus via an interface, such as a video interface.

The computer may operate in a networked environment using logical connections to one or more remote computers. The remote computer may be a personal computer, a server, a router, a network PC, a peer device or other common network node, and typically includes many or all of the elements described above relative to computer. The logical connections depicted in FIG. 1 between the client 106, client 112, and server 104 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

Generally, the data processors of computer are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components (e.g., module-1 108A, module-2 108B, module-3 108C, module-4 108D, module-5 108E and module-N 108F), are illustrated herein as discrete blocks. It is recognized, however, that such programs and components reside at various times in different storage components of the computer, and are executed by the data processor(s) of the computer.

Although described in connection with an exemplary computing system environment, including computer, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computer (e.g., client 106, client 112, and server 104) executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Appendix A contains an exemplary XML definition for a service of a web space.

CSE Static XML Changes

The valid services for a given site are defined in the ComponentizedSite XML files. CSE components that interact with services define their relationship in their own XML definition.

Service XML Declaration

The list of services is a child of the ComponentizedSite XML node. Each service is parsed into an AvailableService object, and the array of these objects is available in code as a property on the ComponentizedSite object. Below is the format of the list of services:

```
<Services>
    <Service Name="..." />
    <Service Name="..." />
</Services>
``` where the "Service Name" is the name of the service. "Service Name" is of type string and is required.

Part Definition XML Changes

Parts can declare themselves to be associated with a service. Doing so will cause the associated service to be added when the part is added to a web space, and it will cause the service reference object to be provided to the part's adapter when the adapter is initialized.

The following XML snippet and attribute definition denotes changes to the Behavior node of the PartDefinition. Only changes are detailed here; the content of the original object remains otherwise unchanged. The service is validated during service initialization, to confirm that the associated service exists on the site. Validation failure will cause an assert in debug builds, and will remove the service association from the part.

```
<PartDefinition Type="...">
    <Behavior Service="..." />
</PartDefinition>
``` where the "Behavior Service" is the name of the associated service. "Behavior Service" is of type string and is optional.

Layout XML/Portfolio Changes

The format of the layout XML persisted in Storage includes a list of services associated with the web space, as well as any configuration which is common to all parts across the web space, or to the full view of the part. Existing APIs automatically handle tasks such as service creation when an associated part is added to a web space.

Portfolio

The Portfolio object is changed to include a list of services as a child. The following XML definition only covers changes to the Portfolio XML; existing attributes and children are unchanged. A hashed service lookup would make more sense than a list, because we want to determine whether a service exists in most cases, not how it's ordered.

```
<Π xmlns="...">
    <Vs>
        <V ... />
        <V ... />
    </Vs>
</Π>
``` where the "Vs" is list of service references with a type of list and "V" is a reference to a service with a type of ServiceReference.

Service Reference

Each service reference in the layout XML declares that a user has opted to use the given service, and contains any settings for the service. Service settings are used whenever a part has settings global across all instances of a part on all pages, or when the full view of a part needs to maintain settings. The settings object is identical to the one used by part references.

```
<V N="..."/>
    <Ss>
        <S ... />
        <S ... />
    <Ss>
</V>
``` where the "N" is list of name of the service with a type of string and "V" is a reference to a service with a type of ServiceReference; "Ss" is a dictionary of service settings of type dictionary; and "S" is a name/value pair representing a setting.

Migration

If the service list does not exist when a Portfolio is created, the service list is constructed from the parts currently in the page. The service list is only constructed based on parts in the layout, not what data is present in Storage, to maintain the current behavior. After migration, all hidden parts will be removed, as services cover the functionality previously provided by hidden parts. Below is psuedo code for constructing the service list according to an embodiment of the invention.

```
namespace host.webspace.V2
{
    public class Portfolio
    {
        internal void Initialize( )
        {
            if (null == Services)
            {
                Services = new List<ServiceReference>( );
                foreach (PageReference page in m_pages)
                {
                    foreach (RegionReference region in page.m_regions)
                    {
                        foreach (PartReference part in region.m_parts)
                        {
                            if (part.Definition.Behavior.Service)
                            {
                                AddService(part.Definition.Behavior.Service);
                            }
                            if (!part.IsVisible)
                            {
                                region.m_parts.Remove(part);
                            }
                        }
                    }
                }
            }
        }
    }
}
```

What is claimed is:

1. A method for associating a service to a web space of a user, said web space being hosted on a server accessible via a data communication network, said method comprising:

creating, by the server, a plurality of computer-executable program modules, said plurality of modules providing the user with one or more tools for engaging in social networking via the web space of the user;

associating, by the server, selected modules of the plurality of modules with at least one service, wherein said associating creates at least one logical grouping of modules for providing functions of the at least one service, said at least one service and its associated modules being separate from the web space of the user;

receiving, by the server, a selection from the user corresponding to a first module from the at least one logical grouping of modules, the service being associated with the web space of the user in response to said selection, wherein said first module renders the web space in a first format to a visitor on a client accessing the web space via the data communication network and enables the visitor to the web space to select a second module from the at least one logical grouping of modules associated with the service for rendering the web space in a second format to the visitor without requiring the user to include said second module in the web space;

receiving, by the server, a selection from the visitor corresponding to a second module in the at least one logical grouping of modules, said second module and said first module being associated with the service, wherein the second module renders the web space of the user in a second format on the client of the visitor;

disassociating the first module from the web space of the user by the user;

determining if no modules associated with the service are associated with the web space of the user; and disassociating the service from the web space of the user if no modules associated with the service are associated with the web space wherein the visitor to the web space is blocked from selecting a second module based on the first module, said second module and said first module being associated with the disassociated service.

2. A method of claim 1, wherein the plurality of modules include one or more of the following: small photo viewer, large photo viewer, blog writer, blog categories, blog archives, radio, guestbook, friends, profile, music list, music list index, custom list, book list, blog list, movie list.

3. The method of claim 1, wherein the user customizes the selected first module.

4. The method of claim 1, wherein the first selected module formats content for the web space of the user.

5. The method of claim 1, wherein each of the plurality of computer-executable program modules is defined as a serialized XML object stored in a database.

6. The method of claim 1, wherein the service includes one or more of the following: photo sharing, blogging, people, advertising and lists.

7. The method of claim 1, wherein the steps of creating, associating, and receiving are performed by computer-executable instructions executing on the server, said computer-executable instructions being stored on one or more computer-readable storage device.

8. A method for associating a plurality of services to a web space of a user, said web space being hosted on a server accessible via a data communication network, said web space being used by said user for rendering content to a visitor of said web space, said method comprising:

creating, by the server, a first plurality of computer-executable program modules, said first plurality of modules providing the user with one or more tools for rendering content in the web space of the user;

creating, by the server, a second plurality of computer-executable program modules, said second plurality of modules also providing the user with one or more tools for rendering content in the web space of the user;

associating, by the server, selected modules of the first plurality of modules with a first service, wherein said associating creates a first logical grouping of modules for providing functions of the first service, said first service and its associated modules being separate from the web space of the user;

associating, by the server, selected modules of the second plurality of modules with a second service, wherein said associating creates a second logical grouping of modules for providing functions of the second service, said second service and its associated modules being separate from the web space of the user, wherein the second service is associated with the first service;

receiving, by the server, a selection from the user of a first module from the first logical grouping of modules, said first module being associated with said first service, said first service being associated with the web space of the user in response to said selection, said second service being associated with the web space of the user due to the second service being associated with the first service, wherein first module renders the web space in a first format to a visitor on a client accessing the web space via the data communication network and enables the visitor to the web space to select a second module from the first logical grouping of modules associated with said first service for rendering the web space in a second format to the visitor without requiring the user to include said second module in the web space;

receiving, from the visitor via the client accessing the web space, a selection corresponding to a second module in the first logical grouping of modules, said second module and said first module being associated with the first service, wherein the second module renders the web space of the user on the client of the visitor in a second format;

disassociating the first module from the web space of the user by the user;

determining if no modules associated with the service are associated with the web space of the user; and disassociating the service from the web space of the user if no modules associated with the service are associated with the web space wherein the visitor to the web space is blocked from selecting a second module based on the first module, said second module and said first module being associated with the disassociated service.

9. The method of claim 8, wherein the first and second logical grouping of modules include one or more of the following: small photo viewer, large photo viewer, blog writer, blog categories, blog archives, radio, guestbook, friends, profile, music list, music list index, custom list, book list, blog list, movie list.

10. The method of claim 8, wherein the user customizes the selected first module.

11. The method of claim 8, wherein the first and second plurality of modules provide the user with tools for engaging in social networking.

12. The method of claim 8, wherein the first and second service include one or more of the following: photo sharing, blogging, people, advertising and lists.

13. The method of claim 8, wherein each of the plurality of computer-executable program modules is defined as a serialized XML object stored in a database.

14. A system for rendering a web space of a user to a visitor:
a server for hosting the web space of the user, said server being accessible via a data communication network, said server including a processor configured for executing instructions for:
creating a plurality of computer-executable program modules, said plurality of modules providing the user with one or more tools for engaging in social networking;
associating selected modules of the plurality of modules with a service, wherein said associating creates a logical grouping of modules for providing functions of the at least one service, said service and its associated modules being separate from the web space of the user;
identifying a first module in the logical grouping of modules selected by the user, the service associated with the logical grouping of modules also being associated with the web space of the user in response to the selection of the first module;
disassociating the first module from the web space of the user by the user;
determining if no modules associated with the service are associated with the web space of the user; and
disassociating the service from the web space of the user if no modules associated with the service are associated with the web space wherein the visitor to the web space is blocked from selecting a second module based on the first module, said second module and said first module being associated with the disassociated service;
a client for connecting the visitor to the web space of the user, said first module rendering the web space on the client, said client being configured for executing instructions for:
accessing the web space of the user by the client via the data communication network, wherein the first module renders the web space in a first format to the visitor on said client; and
receiving a selection of a second module in the logical grouping of modules from the visitor via the client, said second module and said first module being associated with the service, wherein the second module renders the web space of the user on the client of the visitor in a second format without requiring the user to include said second module in the web space.

15. The system of claim 14, wherein the first selected module formats content for the web space of the user.

16. The method of claim 14, wherein each of the plurality of computer-executable program modules is defined as a serialized XML object stored in a database.

* * * * *